(12) United States Patent
Song

(10) Patent No.: US 12,375,454 B2
(45) Date of Patent: Jul. 29, 2025

(54) METHOD AND APPARATUS FOR DATA ANONYMIZATION AND PSEUDONYMIZATION IN M2M SYSTEM

(71) Applicants: Hyundai Motor Company, Seoul (KR); Kia Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 247 days.

(21) Appl. No.: 18/008,641

(22) PCT Filed: Jun. 28, 2021

(86) PCT No.: PCT/KR2021/008069
§ 371 (c)(1),
(2) Date: Dec. 6, 2022

(87) PCT Pub. No.: WO2022/014897
PCT Pub. Date: Jan. 20, 2022

(65) Prior Publication Data
US 2023/0224280 A1 Jul. 13, 2023

Related U.S. Application Data

(60) Provisional application No. 63/052,039, filed on Jul. 15, 2020.

(51) Int. Cl.
*H04L 9/40* (2022.01)
*G06F 21/62* (2013.01)
*H04L 67/12* (2022.01)

(52) U.S. Cl.
CPC ...... *H04L 63/0407* (2013.01); *G06F 21/6254* (2013.01); *H04L 63/0421* (2013.01); *H04L 67/12* (2013.01)

(58) Field of Classification Search
CPC ..... H04L 63/0421; H04L 63/10; H04L 67/12; H04L 63/0407; G06F 21/6254; H04W 4/70; H04W 12/02; H04W 12/37
See application file for complete search history.

(56) References Cited

U.S. PATENT DOCUMENTS 9,154,501 B2 * 10/2015 Jin ............... H04L 63/0407
11,240,212 B2 * 2/2022 Choyi .......... H04L 63/0435
(Continued)

FOREIGN PATENT DOCUMENTS

KR 20180106934 A * 10/2018 ............ H04L 67/12

OTHER PUBLICATIONS

Song, Jaeseung et al. Use case on data protection related regulations. oneM2M Working Documents. WG I. RDM #41. Shanghai. Jul. 10, 2019.
(Continued)

*Primary Examiner* — Sm A Rahman
(74) *Attorney, Agent, or Firm* — Fox Rothschild LLP

(57) ABSTRACT

The present disclosure relates to a liveness identify in a machine-to-machine (M2M) system, and a method for operating an M2M device may include identifying a protection regulation applied to data, identifying a protection mechanism applied to the data, and transmitting a resource creation request message including information indicating the protection regulation and the protection mechanism to a second M2M device, and the data may include personal information or privacy information that is generated by an application executed in the M2M device.

15 Claims, 12 Drawing Sheets

(56) References Cited

U.S. PATENT DOCUMENTS

| | | | |
|---|---|---|---|
| 2016/0232116 A1* | 8/2016 | Bone | H04L 67/125 |
| 2021/0256159 A1* | 8/2021 | Ninglekhu | H04W 4/70 |
| 2023/0239687 A1* | 7/2023 | Smeets | H04W 12/041 |
| | | | 455/410 |

OTHER PUBLICATIONS

As the IOT Market Becomes More Focused On Data, oneM2M Is Working On GDPR and PIPA Support Issues. Mar. 18, 2020 [Retrieved on Aug. 18, 2021]. Retrieved from the Internet: <URL: https://www.onem2m.org/membership/executi ve-viewpoints/394-as-the-iot-marketbecomes- more-focused-on-data-onem2m-is-working on-gdpr-and-pipa-support-issues>.

Kim, Hyo-Jun et al. OneM2M Standmd that Supports GDPR Privacy Data Processing. TTA Journal.vol. 189, pp. 41-46. May 2020.

Attribute Based Access Control Policy. oneM2M Technical Report. oneM2M-TR-0050-V-0.13.0. May 20, 2020.

Yoo, S.K et al. Smart Mobile Services—M2M Technology and Its Standardization Trends. Electronics and Telecommunications Trends, vol. 26, No. 2, pp. 50-60, Apr. 2011.

Song, JaeSeung et al., "Pseuddonymization and anonymization of privacy data", Doc# SDS-2020-0134-Pseuddonymization_and_ anonymization_of_privacy_data, oneM2M Partners, dated Apr. 14, 2020, 4 pages.

* cited by examiner

METHOD AND APPARATUS FOR DATA ANONYMIZATION AND PSEUDONYMIZATION IN M2M SYSTEM

CROSS REFERENCE TO RELATED APPLICATION

The present application is a national stage under 35 U.S.C. 371 claims priority to International Application PCT/KR2021/008069, filed Jun. 28, 2021, published as WO 2022/014897, which claims priority to U.S. Provisional Patent Application 63/052,039, filed Jul. 15, 2020, the entire contents of which are incorporated herein for all purposes by this reference.

TECHNICAL FIELD

The present disclosure relates to a method and device for protecting data in an machine-to-machine (M2M) system. More particularly, the present disclosure relates to a method and device for anonymizing and pseudonymizing data in an M2M system.

BACKGROUND

Recently, introduction of Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" may be uniformly used for convenience of explanation, but the present disclosure may not be limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

An object of the present disclosure is to provide a method and device for enabling anonymization and pseudonymization for data in a machine-to-machine (M2M) system.

An object of the present disclosure is to provide a method and device for creating a resource including information associated with protection of data in an M2M system.

An object of the present disclosure is to provide a method and device for providing protected data in an M2M system.

According to an embodiment of the present disclosure, a method for operating a first machine-to-machine (M2M) device in an M2M system may include identifying a protection regulation applied to data, identifying a protection mechanism applied to the data, and transmitting a resource creation request message including information indicating the protection regulation and the protection mechanism to a second M2M device, and the data may include personal information or privacy information that is generated by an application executed in the M2M device.

According to an embodiment of the present disclosure, a method for operating a first machine-to-machine (M2M) device in an M2M system may include receiving a resource creation request message including information indicating a protection regulation and a protection mechanism, which are applied to data, from a second M2M device, creating, in response to the resource creation request message, a resource including at least one attribute associated with the protection regulation and the protection mechanism, and storing the data in the resource, and the data may include personal information or privacy information that is generated by an application executed in the second M2M device.

According to an embodiment of the present disclosure, a first M2M device in a machine-to-machine (M2M) system includes a transceiver and a processor coupled with the transceiver. The processor may be configured to identify a protection regulation applied to data, to identify a protection mechanism applied to the data, and to transmit a resource creation request message including information indicating the protection regulation and the protection mechanism to a second M2M device, and the data may include personal information or privacy information that is generated by an application executed in the M2M device.

According to an embodiment of the present disclosure, a first M2M device in a machine-to-machine (M2M) system includes a transceiver and a processor coupled with the transceiver. The processor may be configured to receive a resource creation request message including information indicating a protection regulation and a protection mechanism, which are applied to data, from a second M2M device, to create, in response to the resource creation request message, a resource including at least one attribute associated with the protection regulation and the protection mechanism, and to store the data in the resource, and the data may include personal information or privacy information that is generated by an application executed in the second M2M device.

According to the present disclosure, in a machine-to-machine (M2M) system, data including personal information may be effectively protected.

Effects obtained in the present disclosure are not limited to the above-mentioned effects, and other effects not mentioned above may be clearly understood by those skilled in the art from the following description.

BRIEF DESCRIPTION OF DRAWINGS

The above and other objects, features and advantages of the present disclosure will be more clearly understood from the following detailed description taken in conjunction with the accompanying drawings.

DESCRIPTION

Figure 1:
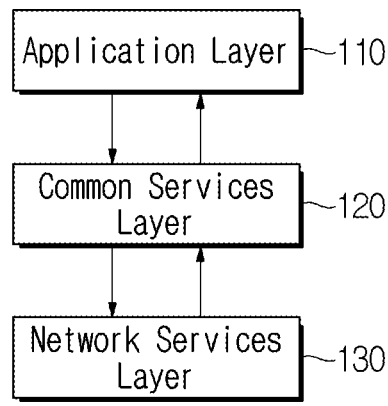
FIG. 1 illustrates a layered structure of a machine-to-machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and may not be limited to the exemplary embodiments described herein.

In the present disclosure, the terms first, second, etc. may be used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component may be referred to as being "linked", "coupled", or "connected" to another component, it may be understood that not only a direct connection relationship but also an indirect connection relationship through an intermediate component may also be included. Also, when a component may be referred to as "comprising" or "having" another component, it may mean further inclusion of another component not the exclusion thereof, unless explicitly described to the contrary.

In the present disclosure, components that may be distinguished from each other may be intended to clearly illustrate each feature. However, it does not necessarily mean that the components may be separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment may be also included within the scope of the present disclosure. Also, exemplary embodiments that include other components in addition to the components described in the various exemplary embodiments may also be included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings may be omitted, and like parts may be denoted by similar reference numerals.

In addition, the present specification describes a network based on Machine-to-Machine (M2M) communication, and a work in M2M communication network may be performed in a process of network control and data transmission in a system managing the communication network.

In the present specification, an M2M terminal may be a terminal performing M2M communication. However, in consideration of backward compatibility, it may be a terminal operating in a wireless communication system. In other words, an M2M terminal may refer to a terminal operating based on M2M communication network but may not be limited thereto. An M2M terminal may operate based on another wireless communication network and may not be limited to the exemplary embodiment described above.

In addition, an M2M terminal may be fixed or have mobility. An M2M server refers to a server for M2M communication and may be a fixed station or a mobile station.

In the present specification, an entity may refer to hardware like M2M device, M2M gateway and M2M server. In addition, for example, an entity may be used to refer to software configuration in a layered structure of M2M system and may not be limited to the embodiment described above.

In addition, for example, the present disclosure mainly describes an M2M system but may not be solely applied thereto.

In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and may not be limited to the embodiment described above.

oneM2M may be a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers may be implemented in a common services layer between M2M applications and communication Hardware/Software (HW/SW) rendering data transmission. For example, a common services layer may be a part of a layered structure illustrated in FIG. 1. The oneM2M standards are referred to herein and incorporated in their entirety into this application. Specifically, the technical specification of the oneM2M Functional Architecture is referred to herein and incorporated herein in its entirety. See Document No. TS-0001-V4.8.0, Functional Architecture and Document No. TS-0001-V3.15.1, Functional Architecture.

FIG. 1 illustrates a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that may be grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
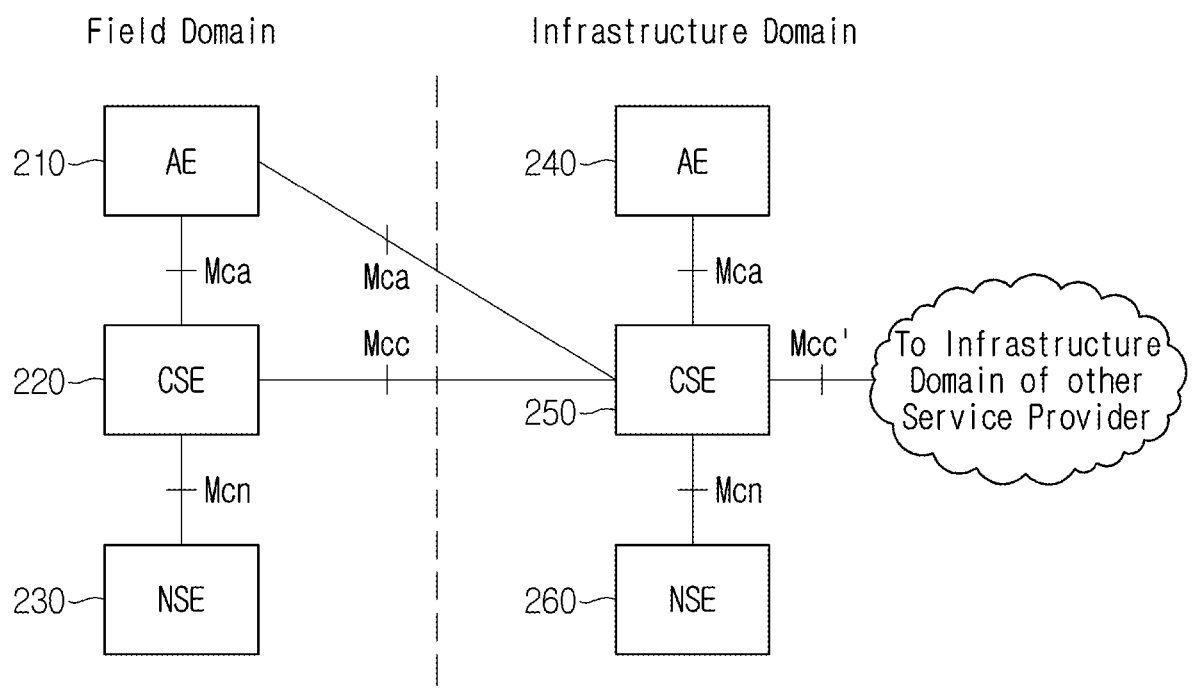
FIG. 2 illustrates a reference point in an M2M system according to the present disclosure.

FIG. 2 illustrates reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
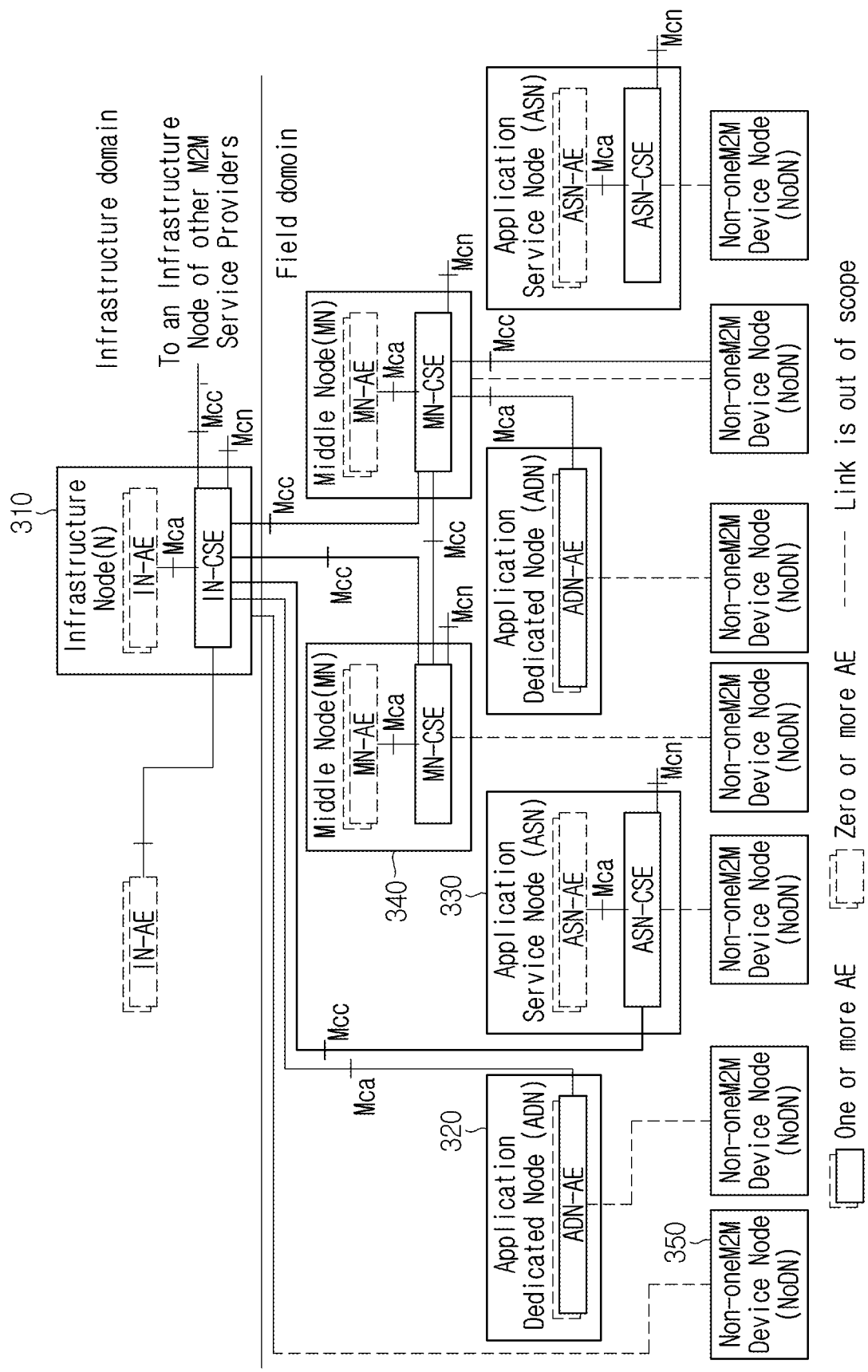
FIG. 3 illustrates each node in an M2M system according to the present disclosure.

FIG. 3 illustrates each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that may be set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that may be set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) may be a node that does not include M2M entities. It may be a node that performs management or collaboration together with an M2M system.

Figure 4:
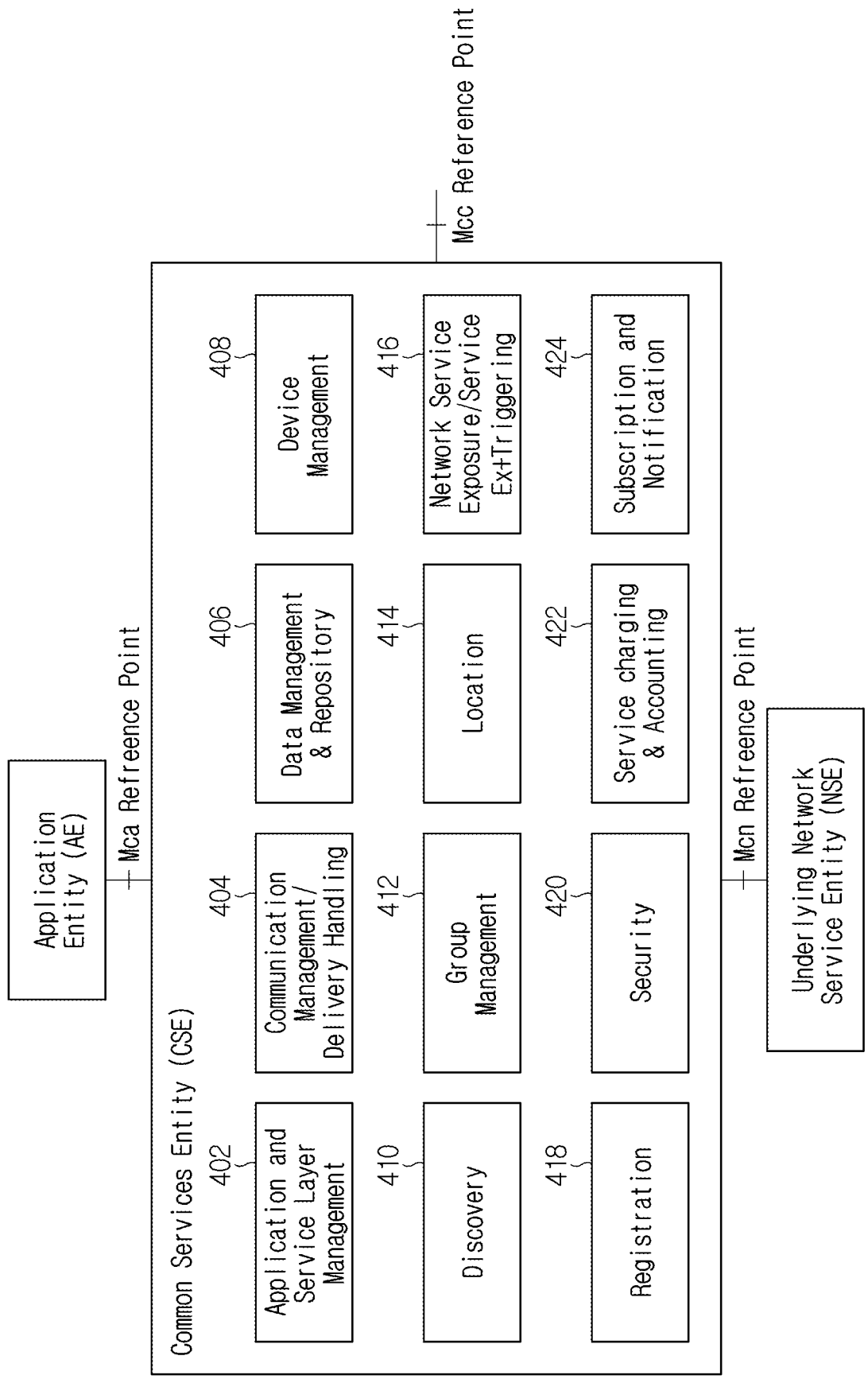
FIG. 4 illustrates a common service function in an M2M system according to the present disclosure.

FIG. 4 illustrates a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and may not be limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF may be configured to determine at what time and through what connection communications may be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF may be configured to provide an information retrieval function for applications and services based on filter criteria. The group management 412 CSF provides processing of group-related requests. The group management 412 CSF enables an M2M system to support bulk operations for many devices and applications. The location 414 CSF may be configured to enable AEs to obtain geographical location information.

The network service exposure/service execution and triggering 416 CSF manages communications with base networks for access to network service functions. The registration 418 CSF may be configured to provide AEs (or other remote CSEs) to a CSE. The registration 418 CSF allows AEs (or remote CSE) to use services of CSE. The security 420 CSF may be configured to provide a service layer with security functions like access control including identification, authentication and permission. The service charging and accounting 422 CSF may be configured to provide charging functions for a service layer. The subscription/notification 424 CSF may be configured to allow subscription to an event and notifying the occurrence of the event.

Figure 5:
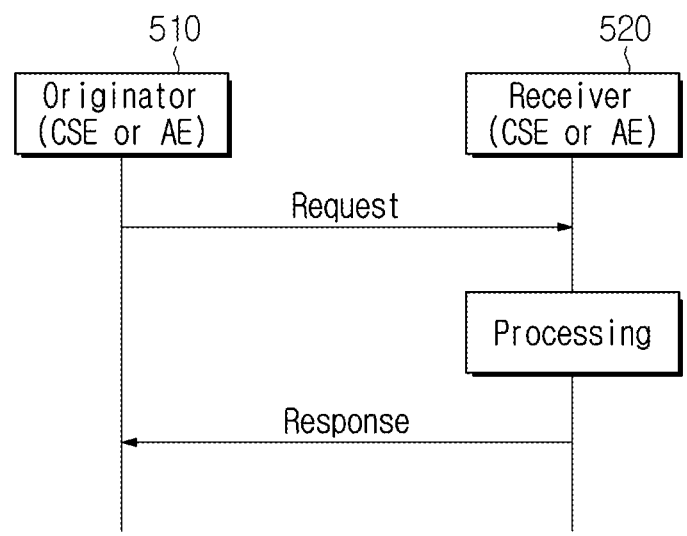
FIG. 5 illustrates a method in which an originator and a receiver exchange a message in an M2M system according to the present disclosure.

FIG. 5 illustrates an exchange of a message between an originator and a receiver in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 may not be limited to M2M terminals but may be other terminals. They may not be limited to the above-described exemplary embodiment. In addition, for example, the originator 510 and the receiver 520 may be nodes, entities, servers or gateways, which may be described above. In other words, the originator 510 and the receiver 520 may be hardware or software configurations and may not be limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete or Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter may be valid and authorized. In particular, in response to determining that a parameter may be valid and authorized, the receiver 520 may be configured to identify whether there may be a requested resource and perform processing accordingly.

For example, in case an event occurs, the originator 510 may be configured to transmit a request message including a parameter for notification to the receiver 520. The receiver 520 may be configured to identify a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
| --- |
| Response Status Code - successful, unsuccessful, ack |
| Request Identifier - uniquely identifies a Request message |
| Content - to be transferred |
| To - the identifier of the Originator or the Transit CSE that sent the corresponding non-blocking request |
| From - the identifier of the Receiver |
| Originating Timestamp - when the message was built |
| Result Expiration Timestamp - when the message expires |
| Event Category - what event category shall be used for the response message |
| Content Status |
| Content Offset |
| Token Request Information |
| Assigned Token Identifiers |
| Authorization Signature Request Information |
| Release Version Indicator - the oneM2M release version that this response message conforms to |

A filter criteria condition, which may be used in a request message or a response message, may be defined as in Table 2 and Table 3 below.

TABLE 2

| Condition tag | Multiplicity | Description Matching Conditions |
| --- | --- | --- |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |

TABLE 2-continued

Matching Conditions

| Condition tag | Multiplicity | Description |
| --- | --- | --- |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. |
| childLabels | 0 . . . 1 | A child of the matched resource has labels attributes matching the specified value. The evaluation is the same as for the labels attribute above. |
| parentLabels | 0 . . . 1 | The parent of the matched resource has labels attributes matching the specified value. The evaluation is the same as for the labels attribute above. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentsize attribute of the <contentInstance> matched resource is equal to or greater than the specified value. |
| sizeBelow | 0 . . . 1 | The contentsize attribute of the <contentInstance> matched resource is smaller than the specified value. |
| contentType | 0 . . . n | The contentinfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 ... 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 ... 1 | The maximum number of resources to be included in the filtering result. This may be modified by the Hosting CSE. When it is modified, then the new value shall be smaller than the suggested value by the Originator. |
| level | 0 ... 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 ... 1 | The number of direct child and descendant resources that a Hosting CSE shall skip over and not include within a Retrieve response when processing a Retrieve request to a targeted resource. |
| applyRelativePath | 0 ... 1 | This attribute contains a resource tree relative path (e.g. . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |

TABLE 4-continued

Request message parameter

Local Token IDs - for use in dynamic authorization
Authorization Signature Indicator - for use in Authorization Relationship Mapping
Authorization Signature - for use in Authorization Relationship Mapping
Authorization Relationship Indicator - for use in Authorization Relationship Mapping
Semantic Query Indicator - for use in semantic queries
Release Version Indicator - the oneM2M release version that this request message conforms to.
Vendor Information A normal resource includes a complete set of representations of data constituting the base of information to be managed. Unless qualified as either "virtual" or "announced", the resource types in the present document may be normal resources. A virtual resource may be used to trigger processing and/or a retrieve result. However, a virtual resource may not have a permanent representation in a CSE. An announced resource may contain a set of attributes of an original resource. When an original resource changes, an announced resource may be automatically updated by the hosting CSE of the original resource. The announced resource contains a link to the original resource. Resource announcement enables resource discovery. An announced resource at a remote CSE may be used to create a child resource at a remote CSE, which may not be present as a child of an original resource or may not be an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

IoT technology may be applied to various devices. According to the use of a device, data generated from the device may include privacy information. Personal information needs to be protected, and each country may have a regulation on reporting personal information. For example, the general data protection regulation (GDPR) of the European Union (EU) and the Korea personal information protection act (PIPA) are such regulations.

GDPR is a regulation in EU law on data protection and privacy for all individual citizens of the European Union and the European Economic Area. Business processes that handle personal data must be designed and built with consideration of the principles and provide safeguards to protect data. For example, pseudonymization or full anonymization may be used where appropriate. In addition, business processes that handle personal data must use the highest-possible privacy settings by default, so that the data is not available publicly without explicit, informed consent and cannot be used to identify a subject without additional information stored separately.

PIPA is a framework act on data protection both in the private sector and the public sector in Korea. For example, PIPA may include the Act on Promotion of Information and Communications Network Utilization and Information Protection, the Act on the Use and Protection of Credit Information, the Act on the Protection, Use, etc. of Location Information, the Act on the Development of Cloud Computing and the Protection of its Users and the like.

An IoT platform is a place holder to collect and manage data including personal and private data. Accordingly, an IoT platform may be subject to privacy-related regulations like PIPA and GDPR. Accordingly, the following issues need to be defined. It is necessary to define how to detect data to be handled as privacy data (e.g., by administrator, by users manually, automatically, etc.), what to do with the detected or marked privacy data (e.g., decide which regulation should be applied, decide which data processing techniques should be used, etc.), and how to apply pseudonymization or anonymization.

Figure 6:
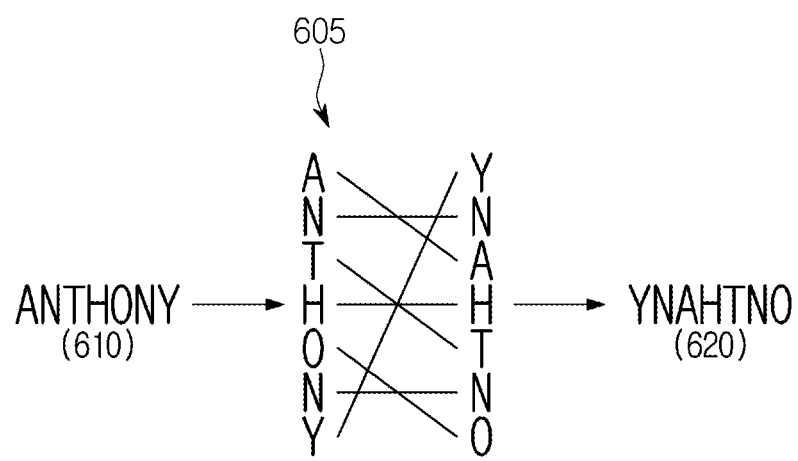
FIG. 6 illustrates an example of data pseudonymization applicable to an M2M system according to the present disclosure.

Pseudonymization means a technique of processing personal data in such a manner that the personal data can no longer be attributed to a specific data subject without the use of additional information. Herein, the additional information is kept separately and is subject to technical and organizational measurement to ensure that the personal data is not attributed to an identified or identifiable natural person. FIG. 6 illustrates an example of data pseudonymization applicable to an M2M system according to the present disclosure. Referring to FIG. 6, the original data 'ANTHONY' 610 may be transformed into 'YNAHTNO' 620 by a pseudonymization operation 605.

Figure 7:
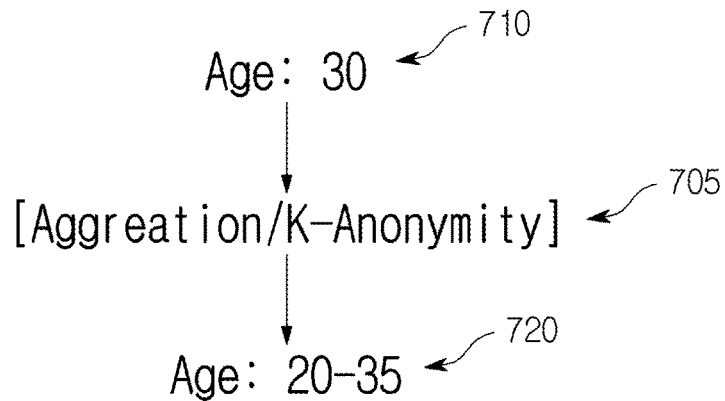
FIG. 7 illustrates an example of data anonymization applicable to an M2M system according to the present disclosure.

According to an anonymization technique, data needs to stripped of sufficient elements such that a data subject can no longer be identified. More precisely, data should be processed in such a way that it can no longer be used to identify a natural person by using 'all the means likely reasonably to be used' by either a controller or a third party. Herein, an important factor is that the processing should be irreversible. FIG. 7 illustrates an example of data anonymization applicable to an M2M system according to the present disclosure. Referring to FIG. 7, 'Age: 30' 710 may be transformed into 'Age: 20-36' 720 by an aggregation and K-anonymity operation 705.

The above-described pseudonymization and anonymization may help a data processor satisfy data conformance regulations and also reduce the risk of data loss. Accordingly, pseudonymization and anonymization may be handled as main techniques for complying with GDPR and the like in an IoT platform. There are two techniques, and the two techniques provide different results after processing. Accordingly, the use of the techniques in an IoT platform may depend on a degree of risk and how data is to be handled. Additionally, various algorithms and implementations are possible for each technique.

Figure 8:
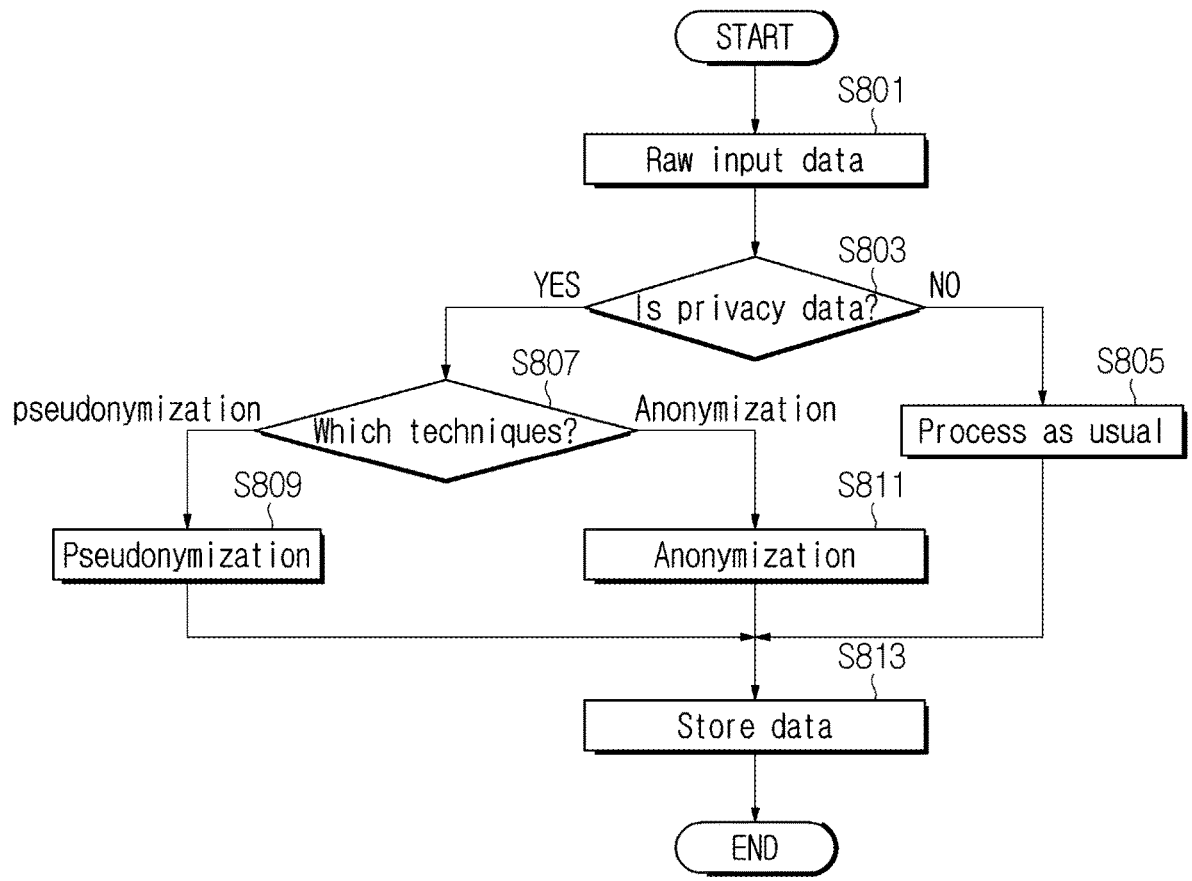
FIG. 8 illustrates an example of a procedure of handling privacy data in an M2M system according to the present disclosure.

FIG. 8 illustrates an example of a procedure of handling privacy data in an M2M system according to the present disclosure. Referring to FIG. 8, at step S801, raw input data is obtained. At step S803, it is determined whether or not the obtained data is privacy data. In case the obtained data is not privacy data, at step S805, the data is processed in an usual way. Herein, the usual way means a way with no additional protective handling. In case the obtained data is privacy data, at step S807, it is determined which technique is to be applied. When pseudonymization is selected, at step S809, a pseudonymization operation is performed for the obtained data. When anonymization is selected, at step S811, an anonymization operation is performed for the obtained data. After pseudonymization or anonymization, at step S813, data is stored.

Figure 9:
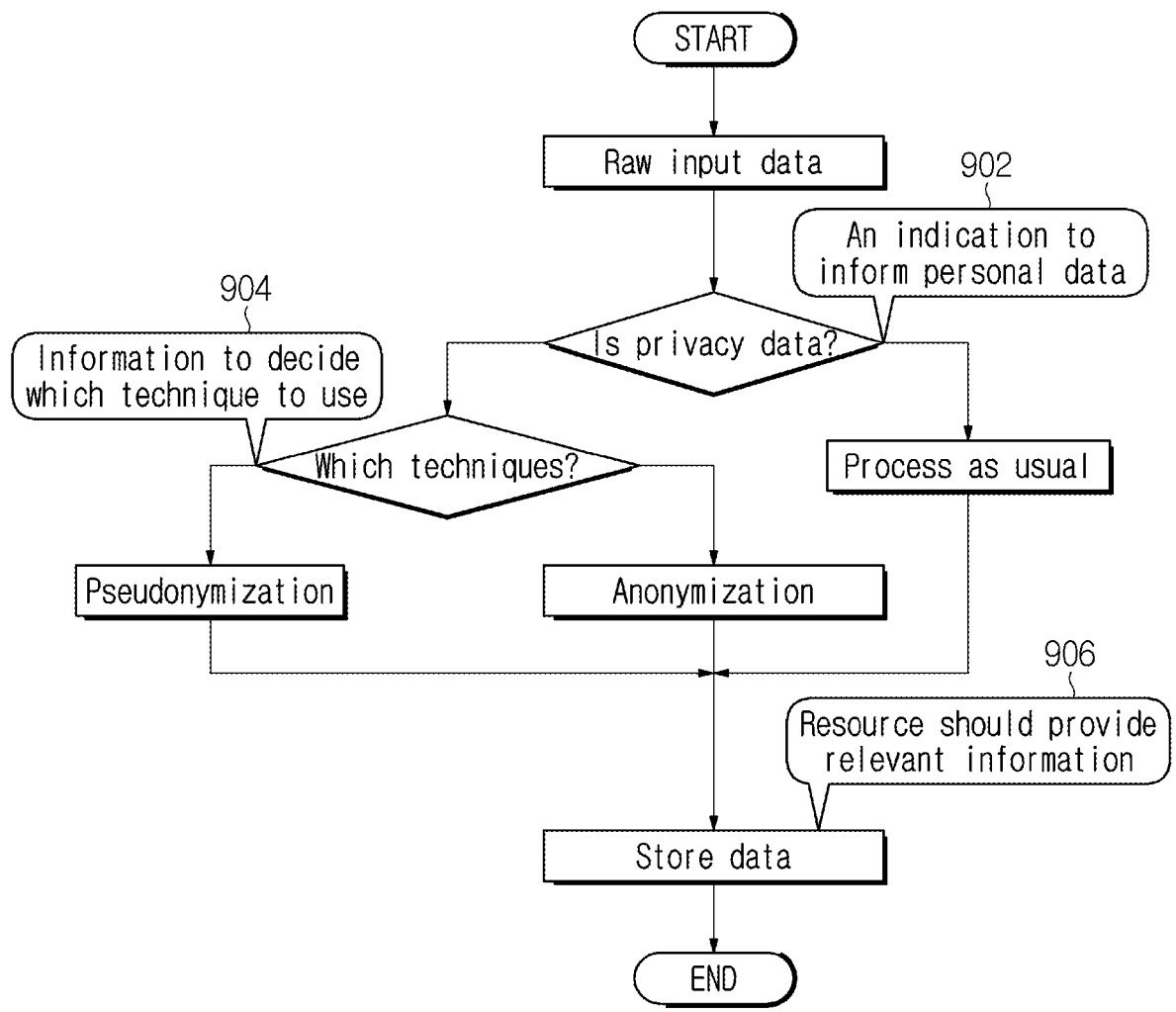
FIG. 9 illustrates points where data protection-related information is utilized in a handling procedure for privacy data in an M2M system according to the present disclosure.

In a privacy management procedure like in FIG. 8, points, where information associated with data protection is utilized according to various embodiment, are as shown in FIG. 9. FIG. 9 illustrates points where data protection-related information is utilized in a handling procedure for privacy data in an M2M system according to the present disclosure. Referring to FIG. 9, when it is determined whether or not obtained data is privacy data, an indicator 902 for informing personal data may be used. When a technique to be applied is selected, information 904 for determining a technique to be used may be used. In addition, when storing data after processing, a resource may provide relevant information (906).

A data protection technique according to various embodiments may be applied to various situations. For example, a data protection technique may be applied to a wearable device that has a function of measuring body temperature. Specifically, a user A may purchase a body temperature sensor and stores a measured temperature in an IoT platform with the user A's personal information. Herein, the personal information may include the user A's name, identification information and body temperature. A uniform resource identifier (URI) of a newly created resource for a wearable IoT service may be formatted using the user A's name. The name and contents of the resource may all be subject to a protection regulation (e.g., GDPR).

To this end, a user or an administrator or a service provider may indicate a protection regulation (e.g., GDPR). A resource for the service may include information associated with a privacy regulation and data processing. When measured data from a sensor is sent to an IoT platform, proper data processing may be applied. Other IoT applications having access to the resource can only see processed data.

According to various embodiments, an IoT system may perform at least one of anonymization and pseudonymization for personal data. An IoT system may consider a regulation associated with data processing and apply proper data processing techniques (e.g., anonymization, pseudonymization, etc.). To this end, according to embodiments, at least one of the attributes listed in Table 5 below may be used.

TABLE 5

| Attribute Name | Description |
| --- | --- |
| privacyRegulation | Used to indicate which regulation is to be applied. An example of this attribute is GDPR (for EU) or PIPA (for KR). |
| privacyIndication | Used to indicate that this data is subject to privacy regulation. |
| privacyProcessingRule | Used to mention a technique to be used, for example, pseudonymization or anonymization. |
| privacyTechniques | This attribute may be optionally used to mention about detailed information such as replacement, scrambling, masking, personalized anonymization, and blurring. |
| privacyBlock | If a part of data contains privacy-related data, this attribute may be used to identify an accurate part of data to be handled. For example, Alice-info-3948272 contains 'Alice-info', which is data that should be anonymized. In this case, 10 characters should be anonymized. |
| privacySubject | Used to indicate which parts of a resource are subject for this privacy regulation. |
| allowedOriginalData | Indicate who is allowed to see the original data without any defined process (e.g., pseudonymization and anonymization). |

Figure 10:
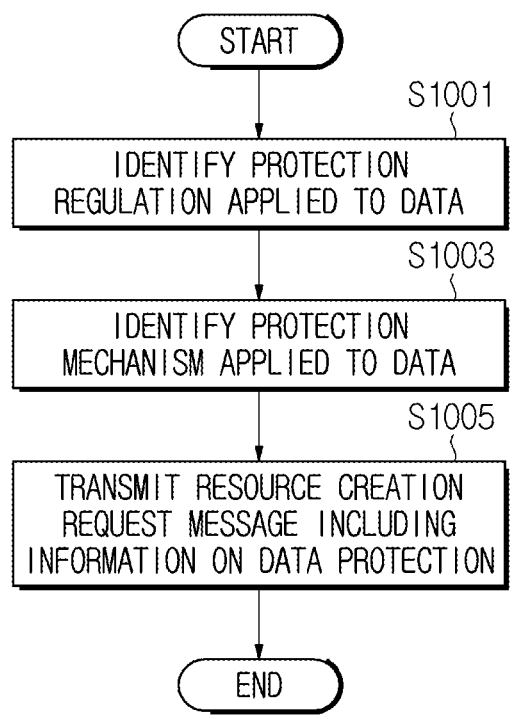
FIG. 10 illustrates an example of a procedure of requesting to create a resource in an M2M system according to the present disclosure.

One of the attributes listed in Table 5 may be included in a resource associated with privacy data. For example, one of the attributes listed in Table 5 may be used as an attribute that is commonly used or may be included in a resource for managing data from an end device like a specific container (e.g., contentInstance). In addition, a resource name and data may all be subject to a corresponding regulation. FIG. 10 illustrates an example of a procedure of requesting to create a resource in an M2M system according to the present disclosure. FIG. 10 exemplifies a method of operating a device including an AE associated with an application capable of generating data including personal information or privacy information.

Referring to FIG. 10, at step S1001, a device identifies a protection regulation that is applied to data. The protection regulation may be GDPR, PIPA and the like, which may be selected according to a country. That is, the device may determine a protection regulation to be applied based on information (e.g., location information) on a region to which the device currently belongs. Herein, the data may include personal information or privacy information that is generated by an application executed in the device.

At step S1003, the device identifies a protection mechanism that is applied to data. As an algorithm used to protect data, the protection mechanism may be one of, for example, anonymization and pseudonymization. According to an embodiment, the device may determine the protection mechanism based on a type of data, based on a setting, or based on a required protection degree.

At step S1005, the device transmits a resource creation request message including information associated with data protection. Herein, the information associated with data protection may include information indicating the protection regulation and the protection mechanism which are determined at step S1001 and at step S1003. That is, the device requests another device including a CSE to create a resource for storing data to be protected (e.g., personal information, privacy information) and to store the data.

According to the embodiment described with reference to FIG. 10, a resource for storing data protected or processed in another device including a CSE may be generated. Although not illustrated in FIG. 10, when data to be protected, that is, new data with privacy information is generated during an operation of a device, the device may request another device to store the new data in a resource that is created according to the above-described procedure.

Figure 11:
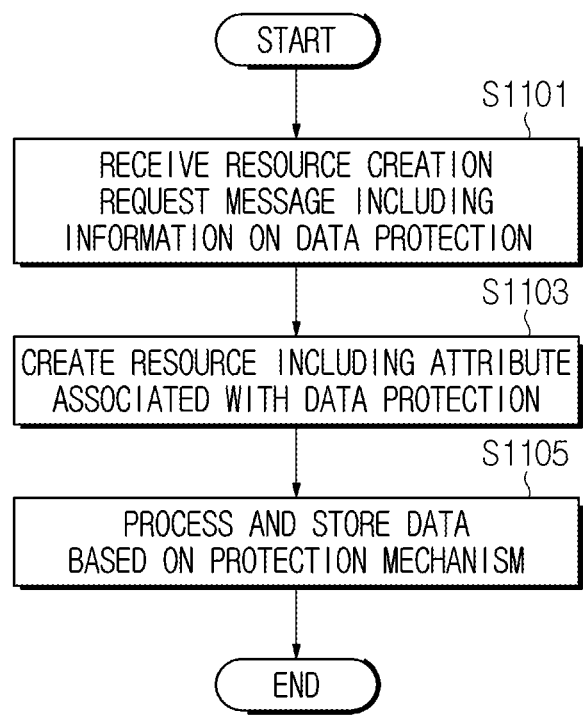
FIG. 11 illustrates an example of a procedure of creating a resource in an M2M system according to the present disclosure.

FIG. 11 illustrates an example of a procedure of creating a resource in an M2M system according to the present disclosure. FIG. 11 exemplifies a method of operating a device including a CSE capable of creating a resource that includes data including personal information or privacy information.

Referring to FIG. 11, at step S1101, a device receives a resource creation request message including information associated with data protection. Herein, the information associated with data protection may include information indicating a protection regulation and a protection mechanism which are determined. The information associated with data protection is determined by a device including an AE associated with an application that generates data to be protected. That is, the device is requested, by another device including an AE, to create a resource for storing data to be protected (e.g., personal information, privacy information) and to store the data.

At step S1103, the device creates a resource including at least one attribute associated with data protection. The attribute associated with data protection may include at least one of an attribute indicating an applied protection regulation, an attribute indicating whether or not relevant data is subject to protection, an attribute indicating a mechanism for protection, an attribute indicating an additional protection technique, an attribute indicating a part of relevant data, which needs to be protected, and an attribute showing an authority to access original data.

At step S1105, the device processes and stores data based on a protection mechanism. That is, the device processes and stores data that is received with the resource creation request message and needs to be protected. Herein, processing is a protection operation based on a protection mechanism and may be one of pseudonymization or anonymization. However, according to another embodiment, processing of data may not be performed when storing but may be performed later based on a separate event.

According to the embodiment described with reference to FIG. 10, a device possesses a resource for storing protected or processed data. Although not illustrated in FIG. 11, when new data to be protected, that is, new data with privacy information is received from another device requesting to create a resource, the device may additionally store the new data in a resource that is created according to the above-described procedure.

Figure 12:
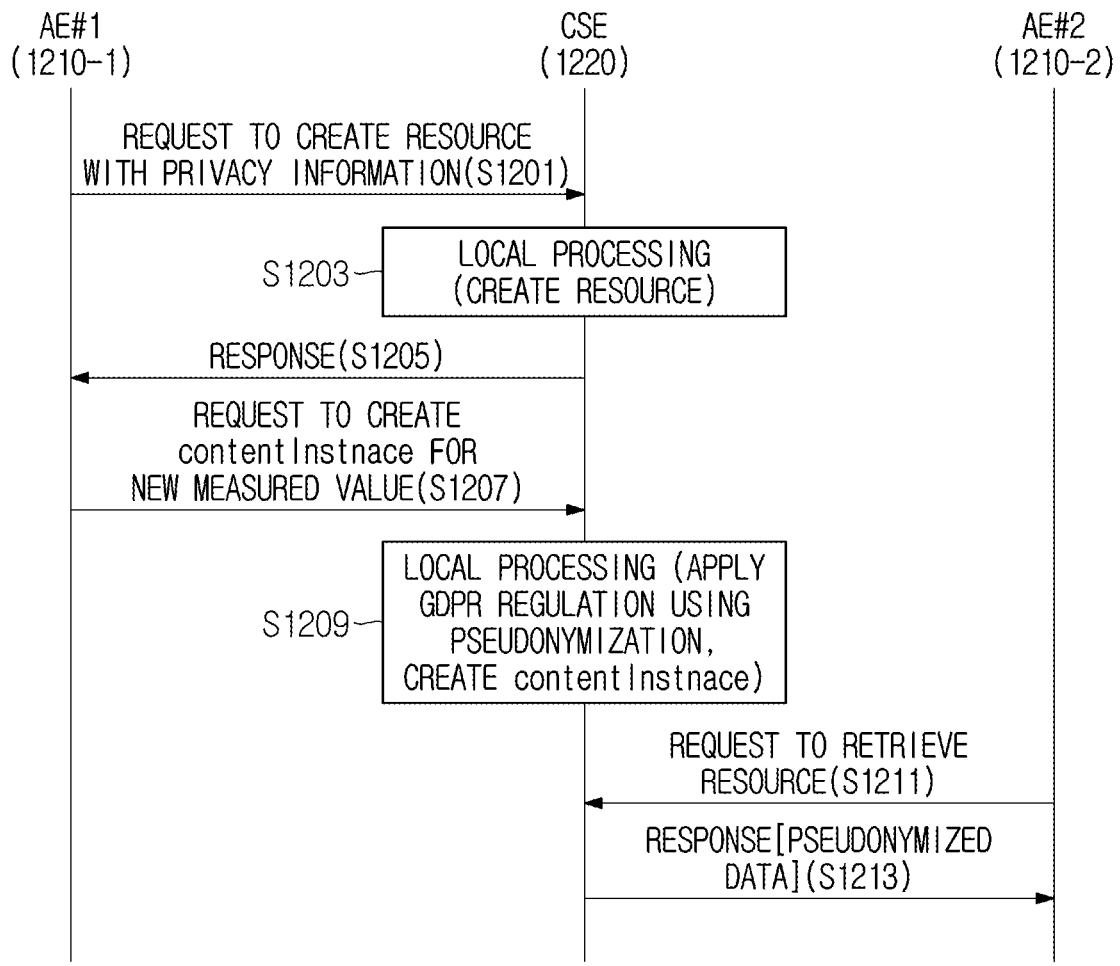
FIG. 12 illustrates an example of a procedure for handling privacy data in an M2M system according to the present disclosure.

FIG. 12 illustrates an example of a procedure for handling privacy data in an M2M system according to the present disclosure. FIG. 12 exemplified a signal exchange among AE #1 1210-1, IN-CSE 1220, and AE #2 1210-2.

Referring to FIG. 12, at step S1201, AE #1 1210-1 requests IN-CSE 1220 to create a resource with privacy information. At this time, an indicator (e.g., GDPR) for an applied regulation and an indicator (e.g., pseudonymization) for an applied mechanism are transmitted together.

At step S1203, IN-CSE 1220 performs local processing for create a resource. Herein, IN-CSE 1220 creates the requested resource based on given privacy-related information. That is, IN-CSE 1220 may create a resource including at least one attribute associated with protection of data. For example, at least one attribute associated with protection of data may include at least one of the attributes listed in Table 5.

At step S1205, IN-CSE 1220 transmits a response to AE #1 1210-1. That is, IN-CSE 1220 notifies that the resource requested by AE #1 1210-1 is created.

At step S1207, AE #1 1210-1 requests to generate a container (e.g., contentInstance) for a new measured value. That is, although not illustrated in FIG. 12, AE #1 1210-1 generates data with privacy information according to execution of an application and transmits the generated data to IN-CSE 1220. Herein, the generated data may include a measurement value that is measured according to an application.

At step S1209, IN-CSE 1220 performs local processing for generating a container (e.g., contentInstance). Specifically, IN-CSE 1220 applies GDPR by using pseudonymization and creates a contentInstance. That is, IN-CSE 1220 may protect privacy information in data by pseudonymizing data through a pseudonymization operation for the data. Accordingly, data in the contentInstance may be pseudonymized.

At step S1211, AE #2 1210-2 requests IN-CSE 1220 to retrieve a resource. That is, AE #2 1210-2 attempts to obtain information of AE #1 1210-1 stored in IN-CSE 1220. Specifically, AE #2 1210-2 reads the contentInstance resource stored in IN-CSE 1220 and attempts to output a value in the contentInstance resource to a user of AE #2 1210-2.

At step S1213, IN-CSE 1220 transmits a response including pseudonymized data to AE #2 1210-2. As the requested resource includes privacy data, the response includes protection-processed, that is, pseudonymized data. Unlike the example of FIG. 12, according to another embodiment, in case AE #2 1210-2 has a permit for original data, the response may include the original data.

According to various embodiments, proposed attributes may be implemented in various ways. For example, an attribute privacyRegulation may be implemented as a single attribute that can have different values. According to an embodiment, the attribute privacyRegulation may have an enumeration value. In this case, 0 may indicate GDPR, 1 may indicate PIPA, and 2 may indicate USA. According to another embodiment, a value underGDPR indicates that a resource associated with the attribute privacyRegulation is data which is subject to GDPR, and a value underPIPA indicates that a resource associated with the attribute privacyRegulation is data which is subject to PIPA.

For example, an attribute privacyProcessingRule may be implemented as a single attribute that can have different values. According to an embodiment, the attribute privacyProcessingRule may have an enumeration value. In this case, 0 may indicate anonymization, and 1 may indicate pseudonymization. According to another embodiment, a value needAnonymization may indicate that data needs to be anonymized, and a value needPseudonymization may indicate that data needs to be pseudonymized.

When data to be pseudonymized or anonymized is given by a given rule, two options may be used. According to an embodiment, when data is requested, a defined algorithm may be performed. According to another embodiment, a defined algorithm may be performed, and processed data may be stored. When an owner or an authorized user tries to access data, original data is returned. But if another user tries to access the data, a defined algorithm may be applied before returning the data.

Figure 13:
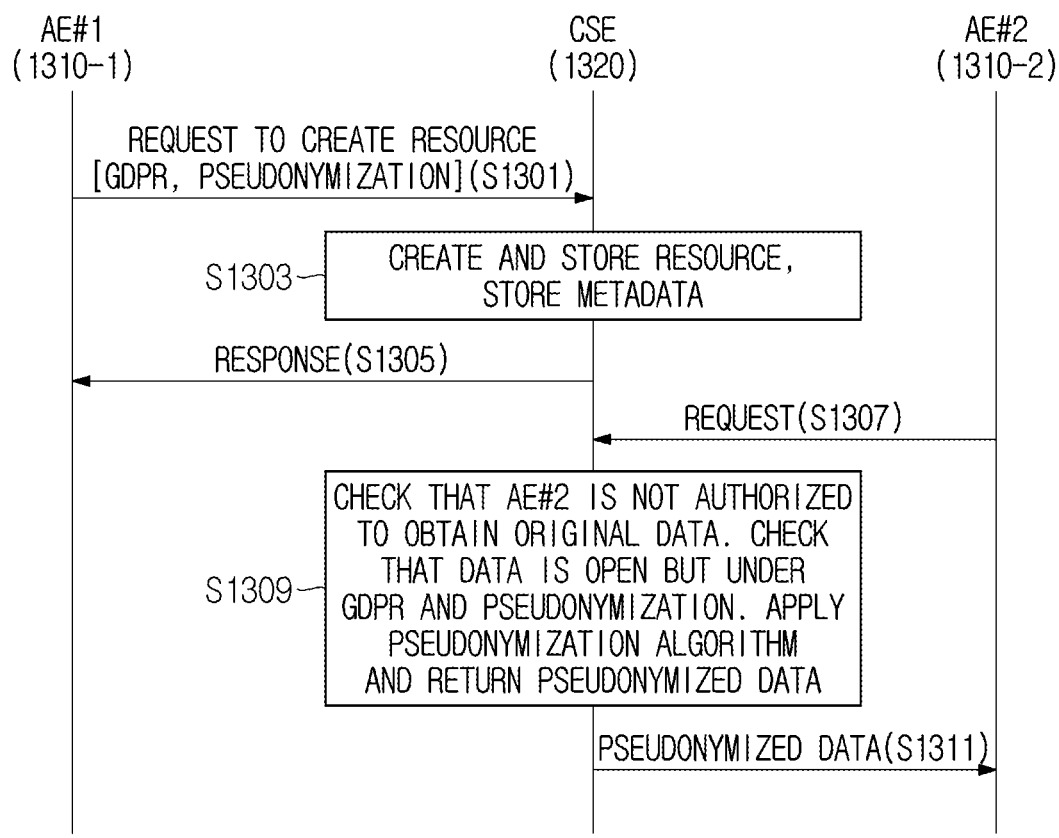
FIG. 13 illustrates an example of a procedure for providing protected data in an M2M system according to the present disclosure.

FIG. 13 illustrates an example of a procedure for providing protected data in an M2M system according to the present disclosure. FIG. 13 exemplifies a case in which protection processing of data is performed when data is requested.

Referring to FIG. 13, at step S1301, AE #1 1310-1 requests CSE 1320 to create a resource. Herein, GDPR is designated as a regulation to be applied, and pseudonymization is designated as a mechanism to be used.

At step S1303, CSE 1320 creates a resource and stores the created resource. In addition, CSE 1320 may store metadata. In this embodiment, at least one proposed attribute may be added the created resource as metadata or attribute. At step S1305, CSE 1320 transmits a response to AE #1 1310-1. At step S1307, AE #2 1310-2 transmits a request for data to CSE 1320.

At step S1309, CSE 1320 identifies that AE #2 1310-2 is not authorized to obtain original data. Based on information on authority, a defined algorithm may be applied before data is transmitted to an originator of the request. An access control policy (ACP) or an additional attribute may be used to indicate who is allowed to access original data and who is allowed to access processed (e.g., pseudonymized or anonymized) data. For example, an attribute allowedOrigianlData may be used to define who is allowed to see original data without pseudonymization or anonymization. The attribute allowedOrigianlData may include a list or identifiers.

In addition, CSE 1320 identifies that data is open but under GDPR and psdudonymization. That is, accordingly, CSE 1320 applies a pseudonymization algorithm to the data and determines to return the pseudonymized data. That is, CSE 1320 pseudonymizes data after a request for the data occurs. At step S1311, CSE 1320 returns the pseudonymized data to AE #2 1310-2.

Figure 14:
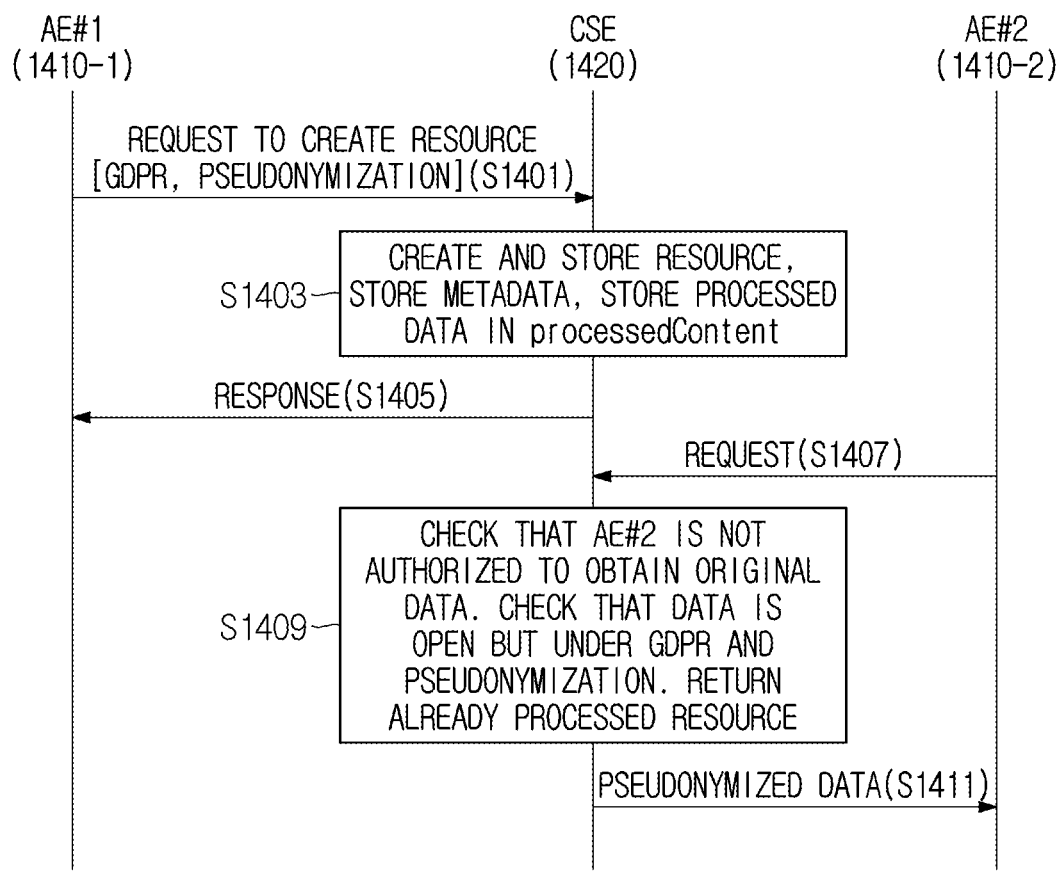
FIG. 14 illustrates another example of a procedure for providing protected data in an M2M system according to the present disclosure.

FIG. 14 illustrates another example of a procedure for providing protected data in an M2M system according to the present disclosure. FIG. 14 exemplifies a case in which protection processing of data is performed when a resource is created.

Referring to FIG. 14, at step S1401, AE #1 1410-1 requests CSE 1420 to create a resource. Herein, GDPR is designated as a regulation to be applied, and pseudonymization is designated as a mechanism to be used.

Figure 15:
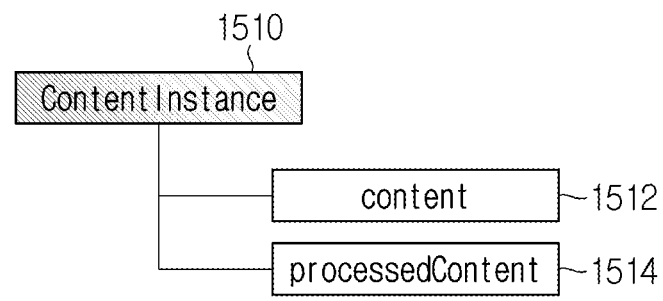
FIG. 15 illustrates an example of a resource including protection-processed data in an M2M system according to the present disclosure.

At step S1403, CSE 1420 creates a resource and stores the created resource. In addition, CSE 1420 may store metadata. In this embodiment, at least one proposed attribute may be added the created resource as metadata or attribute. In addition, CSE 1420 stores processed data in an attribute processedContent. The attribute processedContent used to contain processed data may be used to store the processed data. For example, as in FIG. 15, an attribute processedContent 1514 may be included in a resource ContentInstance 1510 together with an attribute content 1512 containing original data. That is, CSE 1420 pseudonymizes data in a process of creating a resource for the data. At step S1405, CSE 1420 transmits a response to AE #1 1410-1. At step S1407, AE #2 1410-2 transmits a request for data to CSE 1420.

At step S1409, CSE 1420 identifies that AE #2 1410-2 is not authorized to obtain original data. In addition, CSE 1420 identifies that the data is open but under GDPR and psdudonymization. That is, accordingly, CSE 1420 uses an already processed resource to return data. At step S1411, CSE 1420 returns the pseudonymized data to AE #2 1410-2.

According to the embodiment of FIG. 14, when data is requested from an authorized application (e.g., AE #2 1410-2) to obtain processed data, CSE 1420 accesses a value in the attribute processedContent to return the data. In the case of this embodiment, whenever there is a request, an IoT platform needs not perform pseudonymization or anonymization.

Figure 16:
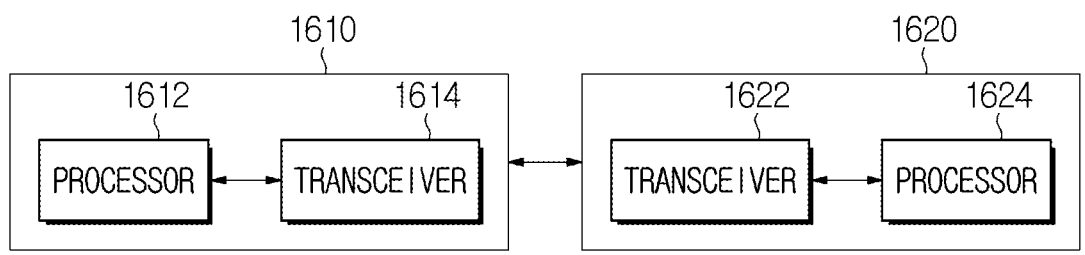
FIG. 16 illustrates a configuration of an M2M device in an M2M system according to the present disclosure.

FIG. 16 illustrates a configuration of an M2M device in an M2M system according to the present disclosure. An M2M device 1610 or an M2M device 1620 illustrated in FIG. 16 may be understood as hardware functioning as at least one among the above-described AE, CSE and NSE.

Referring to FIG. 16, the M2M device 1610 may include a processor 1612 controlling a device and a transceiver 1614 transmitting and receiving a signal. Herein, the processor 1612 may control the transceiver 1614. In addition, the M2M device 1610 may communicate with another M2M device 1620. The another M2M device 1620 may also include a processor 1622 and a transceiver 1624, and the processor 1622 and the transceiver 1624 may perform the same function as the processor 1612 and the transceiver 1614.

As an example, the originator, the receiver, AE and CSE, which may be described above, may be one of the M2M devices 1610 and 1620 of FIG. 16, respectively. In addition, the devices 1610 and 1620 of FIG. 16 may be other devices. As an example, the devices 1610 and 1620 of FIG. 16 may be communication devices, vehicles, or base stations. That is, the devices 1610 and 1620 of FIG. 16 refer to devices capable of performing communication and may not be limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations may be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

The invention claimed is:

1. A method for operating a first machine-to-machine (M2M) device in an M2M system, the method comprising:
identifying a protection regulation applied to data;
identifying a protection mechanism applied to the data; and
transmitting, to a second M2M device, a resource creation request message including information indicating the protection regulation and the protection mechanism,
wherein the resource creation request message is transmitted to create a resource including attributes associated with the protection regulation and the protection mechanism at the second M2M device,
wherein the attributes include an attribute indicating an applied protection regulation and an attribute indicating a mechanism for protection, and
wherein the data includes personal information or privacy information that is generated by an application executed in the M2M device.

2. The method of claim 1, further comprising:
generating, based on the application, another piece of data including personal information; and
transmitting, to the second M2M device, a message for requesting to store the another piece of data in the resource that is created in response to the resource creation request message.

3. The method of claim 1, wherein the protection regulation is one of the general data protection regulation (GDPR) or the Korea personal information Act (PIPA), and
wherein the protection mechanism is one of anonymization and pseudonymization.

4. The method of claim 1, wherein the resource creation request message further includes information on a user authorized to access an original of the data.

5. A method for operating a first machine-to-machine (M2M) device in an M2M system, the method comprising:
receiving, from a second M2M device, a resource creation request message including information indicating a protection regulation and a protection mechanism that are applied to data, wherein the resource creation request message is created at the second M2M device by identifying the protection regulation and the protection mechanism applied to the data;
creating, in response to the resource creation request message, a resource including attributes associated with the protection regulation and the protection mechanism, wherein the attributes include an attribute indicating an applied protection regulation and an attribute indicating a mechanism for protection, and; and
storing the data in the resource,
wherein the data includes personal information or privacy information that is generated by an application executed in the second M2M device.

6. The method of claim 5, further comprising:
receiving a message for requesting to store another piece of data including personal information based on the application; and
storing the another piece of data in the resource.

7. The method of claim 5, wherein the storing of the data in the resource comprises:
processing the data based on the protection mechanism; and
storing the processed data.

8. The method of claim 7, wherein the processed data is stored in at least one of the attributes for processed data in the resource.

9. The method of claim 5, further comprising:
receiving, from a third M2M device, a retrieval request message for data stored in the resource;
processing the data based on the protection mechanism; and
transmitting the processed data to the third M2M device.

10. The method of claim 5, wherein the attributes further include at least one of an attribute indicating whether or not relevant data is subject to protection, an attribute indicating an additional protection technique, an attribute indicating a part of relevant data, which needs to be protected, or an attribute showing an authority to access an original.

11. The method of claim 1, wherein the resource creation request message further includes information on a user authorized to access an original of the data.

12. A machine-to-machine (M2M) device in an M2M system, comprising:
a transceiver; and
a processor coupled with the transceiver,
wherein the processor is configured to:
identify a protection regulation applied to data,
identify a protection mechanism applied to the data, and
transmit, to a second M2M device, a resource creation request message including information indicating the protection regulation and the protection mechanism,
wherein the resource creation request message is transmitted to create a resource including attributes associated with the protection regulation and the protection mechanism at the second M2M device,
wherein the attributes include an attribute indicating an applied protection regulation and an attribute indicating a mechanism for protection, and
wherein the data includes personal information or privacy information that is generated by an application executed in the M2M device.

13. The M2M device of claim 12, wherein the processor is further configured to:
generate, based on the application, another piece of data including personal information; and
transmit, to the second M2M device, a message for requesting to store the another piece of data in the resource that is created in response to the resource creation request message.

14. The M2M device of claim 12, wherein the protection regulation is one of the general data protection regulation (GDPR) or the Korea personal information Act (PIPA), and
wherein the protection mechanism is one of anonymization or pseudonymization.

15. The M2M device of claim 12, wherein the resource creation request message further includes information on a user authorized to access an original of the data.

* * * * *